E. A. PENNOYER.
SHAFT BEARING.
APPLICATION FILED MAY 27, 1919.

1,360,787.

Patented Nov. 30, 1920.

Witnesses
Lo. B. James

Inventor
E. A. Pennoyer
By Victor J. Evans
Attorney

UNITED STATES PATENT OFFICE.

EDWARD A. PENNOYER, OF GREENVILLE, SOUTH CAROLINA.

SHAFT-BEARING.

1,360,787.  Specification of Letters Patent.  Patented Nov. 30, 1920.

Application filed May 27, 1919. Serial No. 300,034.

*To all whom it may concern:*

Be it known that I, EDWARD A. PENNOYER, a citizen of the United States, residing at Greenville, in the county of Greenville and State of South Carolina, have invented new and useful Improvements in Shaft-Bearings, of which the following is a specification.

This invention relates to a shaft bearing and comprehends a construction primarily designed for use in connection with the protection rod of the weaving loom.

The invention aims to provide a yieldably supported bearing, which is self adjusting with relation to said rod, to compensate for wear as the latter occurs, thus saving time and labor by preventing stoppage of the loom, which is necessary with the form of bearing now in use.

The nature and advantages of the invention will be better understood when the following detailed description is read in connection with the accompanying drawing, the invention residing in the construction, combination and arrangements of parts as claimed.

In the drawing forming part of this specification, like numerals of reference indicate similar parts in the several views and wherein.

Figure 1:
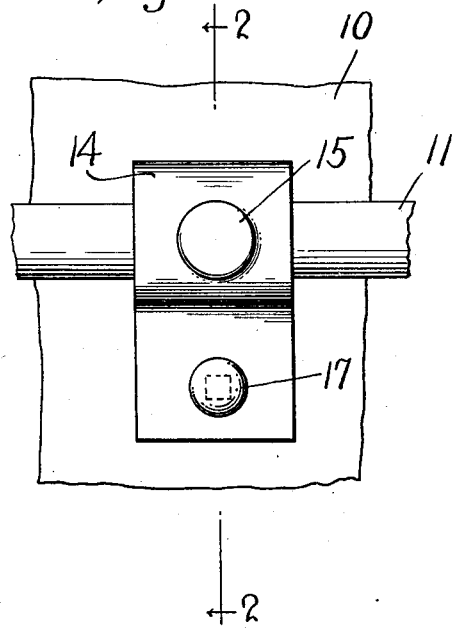
Figure 1 is a side elevation of the bearing constructed in accordance with my invention, showing the same in position for use.
Figure 2:
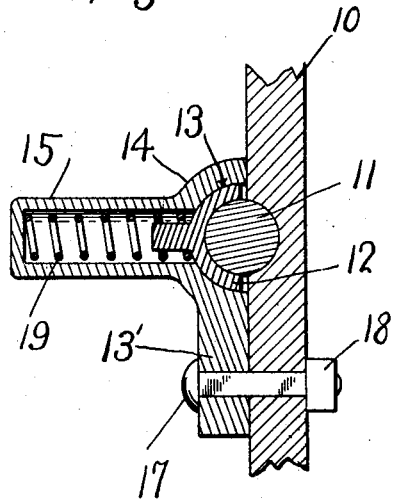
Fig. 2 is a sectional view taken on line 2—2 of Fig. 1.
Figure 3:
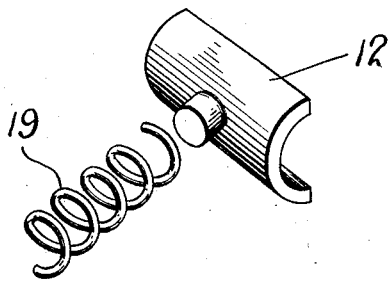
Fig. 3 is a detail view showing the adjustable bearing and the spring removed from their support.

Referring to the drawing in detail, 10 indicates a part of the loom which is cut away to provide for the reception of the protector rod 11, the member 10 forming the fixed part of the bearing. The movable part of the bearing is indicated at 12, and comprises an arcuate shaped member adapted to embrace that portion of the rod which projects from the member 10. The movable bearing 12 is seated within a recess 13 of a support or casting 14, the recess 13 being of a shape corresponding to the configuration of the movable portion 12 of the bearing. The casting 14 is provided with an extension $13^1$ which bears against the member 10, and passed through the extension $13^1$ and the member 10 is a headed bolt 17 having a nut 18 associated therewith, whereby the casting and the member are fixed relatively.

The body portion of the casting 14 is hollow and of tubular formation in cross section as shown at 15 to receive a coiled spring 19, one end of which bears against the closed end of the body portion, while the opposite end of said spring bears against the movable portion 12 of the bearing and receives a stud 20 so that the spring is maintained in proper relation with the movable portion 12. Manifestly, by reason of the construction disclosed, the movable portion 12 of the bearing is always maintained in proper relation to the protector rod 11, under the influence of the spring, thus compensating for wear of the bearing as it occurs. This fact eliminates the necessity of stopping the loom, to file the bearing for an adjustment of the latter with relation to the rod, which must be done with the bearing now in use.

While I have shown and described what I consider the preferred embodiment of the invention, I desire to have it understood that I do not limit myself in this connection and that such changes may be resorted to when desired as fall within the scope of what is claimed.

What I claim is:—

1. The combination with a weaving loom, having a recess formed in a portion thereof for the reception of the protecting rod, of a casting having a semi-cylindrical portion and a hollow cylindrical extension opening into the semi-cylindrical portion, said extension being closed at its opposite end, means for securing the casting to that part of the loom supporting the protector rod, an arcuate shaped bearing seated within the semi-cylindrical portion of the casting, a stem projecting from said member, within the hollow extension of the casting, and a coiled spring encircling said stem and bearing against the arcuate member and the closed end of said extension whereby the arcuate member is suitably held in engagement with said rod, for the purpose specified.

2. The combination with a weaving loom having a recess formed in a portion thereof for the reception of the protecting rod, of a substantially L-shaped casting formed to provide a semi-cylindrical portion at the point of juncture between the respective branches of casting, one of said branches being of hollow cylindrical formation communicating with said semi-cylindrical portion, the outer end of said branch being closed, means for securing the other branch of the casting to said loom, an arcuate shaped bearing seated in the semi-cylindrical portion of the casting, a stem projecting from said member, a coiled spring encircling said stem and arranged within the cylindrical branch of the casting and bearing against the closed end thereof, whereby the arcuate member is suitably held in engagement with said rod for the purpose specified.

In testimony whereof I affix my signature.

EDWARD A. PENNOYER.